United States Patent
Nahata et al.

(10) Patent No.: US 10,142,187 B2
(45) Date of Patent: Nov. 27, 2018

(54) PREDICTING AN EFFECT OF PERFORMING AN ACTION ON A NODE OF A GEOGRAPHICAL NETWORK

(71) Applicant: Accenture Global Solutions Limited, Dublin (IE)

(72) Inventors: Charu Nahata, Bangalore (IN); Milton Jay Merl, New York, NY (US); Amit C. Naik, New York, NY (US); Yogesh P. Pawar, Mumbai (IN); Harsiddhi Tamboli, Nimbahera (IN); Joseph S. Bottom, Chico, CA (US)

(73) Assignee: Accenture Global Soltuions Limited, Dublin (IE)

( * ) Notice: Subject to any disclaimer, the term of this patent is extended or adjusted under 35 U.S.C. 154(b) by 202 days.

(21) Appl. No.: 15/141,138

(22) Filed: Apr. 28, 2016

(65) Prior Publication Data

US 2016/0323151 A1 Nov. 3, 2016

(30) Foreign Application Priority Data

Apr. 29, 2015 (IN) .......................... 2180/CHE/2015

(51) Int. Cl.
*G06F 15/173* (2006.01)
*H04L 12/24* (2006.01)
*H04L 12/26* (2006.01)

(52) U.S. Cl.
CPC .......... *H04L 41/147* (2013.01); *H04L 43/16* (2013.01)

(58) Field of Classification Search
CPC .............................. H04L 41/147; H04L 43/16
See application file for complete search history.

(56) References Cited

U.S. PATENT DOCUMENTS

| 7,386,477 | B2 * | 6/2008 | Fano | G06F 17/3087 |
| | | | | 705/26.43 |
| 8,099,365 | B2 * | 1/2012 | Bhambri | G06Q 30/02 |
| | | | | 380/201 |

(Continued)

FOREIGN PATENT DOCUMENTS

| CA | 2349277 | 7/2002 |
| WO | WO 2003/054478 | 7/2003 |

OTHER PUBLICATIONS

Neslin et al., "Challenges and Opportunities in Multichannel Customer Management", Journal of Service Research, vol. 9 No. 2 (2006), pp. 95-112.

*Primary Examiner* — June Y Sison
*Assistant Examiner* — Dixon F Dabipi
(74) *Attorney, Agent, or Firm* — Harrity & Harrity, LLP

(57) ABSTRACT

A device may include one or more processors. The device may receive first information identifying a plurality of nodes and transactions associated with the plurality of nodes. The transactions may be between nodes, of the plurality of nodes, and entities of a plurality of entities. The device may determine geographical locations corresponding to the plurality of nodes. The device may determine second information, based on the first information, that may identify nodes, of the plurality of nodes, that are associated with shared entities. The device may generate, based on the geographical locations and the second information, a geographical network. The device may select a selected node, of the geographical network, on which to perform an action. The device may determine third information based on predicting future performance of the geographical network assuming that the action is performed. The device may store or provide the third information.

20 Claims, 9 Drawing Sheets

(56) References Cited

U.S. PATENT DOCUMENTS

| | | | |
|---|---|---|---|
| 2003/0028417 A1* | 2/2003 | Fox | G06Q 10/06 |
| | | | 705/7.34 |
| 2004/0078294 A1* | 4/2004 | Rollins | G06Q 20/02 |
| | | | 705/27.1 |
| 2004/0098296 A1* | 5/2004 | Bamberg | G06Q 10/087 |
| | | | 705/7.31 |
| 2006/0069606 A1* | 3/2006 | Kaczkowski | G06Q 10/0631 |
| | | | 705/7.12 |
| 2009/0187464 A1 | 7/2009 | Bai et al. | |

* cited by examiner

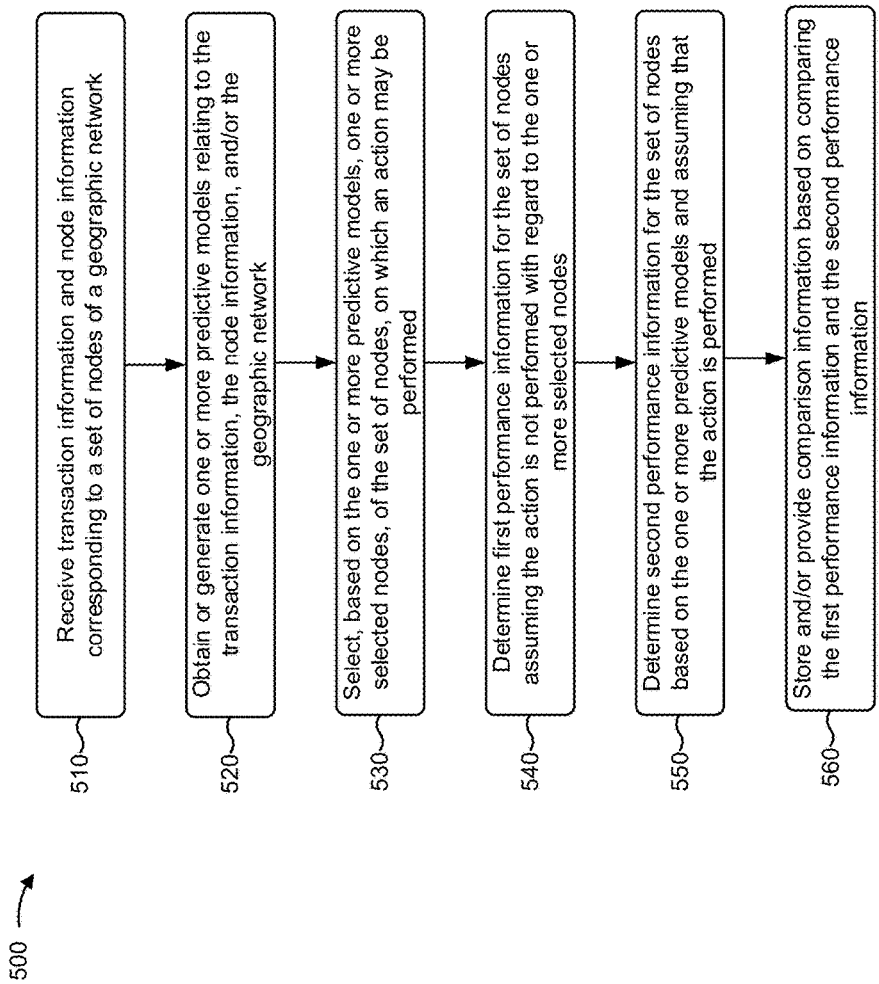

PREDICTING AN EFFECT OF PERFORMING AN ACTION ON A NODE OF A GEOGRAPHICAL NETWORK

RELATED APPLICATION

This application claims priority under 35 U.S.C. § 119 to Indian Patent Application No. 2180/CHE/2015, filed on Apr. 29, 2015, the content of which is incorporated by reference herein in its entirety.

BACKGROUND

A set of nodes may be geographically distributed in an area. Each node, of the set of nodes, may perform transactions with entities. Some entities may perform transactions with multiple, different nodes at different times. For example, an entity may perform a first transaction with a first node, and may subsequently perform a second transaction at a second node.

SUMMARY

According to some possible implementations, a device may include one or more processors. The one or more processors may receive first information identifying a plurality of nodes and transactions associated with the plurality of nodes. The transactions may be between nodes, of the plurality of nodes, and entities of a plurality of entities. The one or more processors may determine geographical locations corresponding to the plurality of nodes. The one or more processors may determine second information based on the first information. The second information may identify nodes, of the plurality of nodes, that are associated with shared entities. A shared entity may be an entity that has performed transactions with at least two nodes of the plurality of nodes. The one or more processors may generate, based on the geographical locations and the second information, a geographical network that includes the at least two nodes. The one or more processors may select a selected node, of the at least two nodes, on which to perform an action. The one or more processors may determine third information based on predicting future performance of the at least two nodes assuming that the action is performed. The one or more processors may store or provide the third information.

According to some possible implementations, a non-transitory computer-readable medium may store one or more instructions that, when executed by one or more processors, may cause the one or more processors to receive input information identifying a plurality of nodes. The input information may identify a plurality of transactions between nodes, of the plurality of nodes, and entities of a plurality of entities. The one or more instructions, when executed by one or more processors, may cause the one or more processors to determine overlap information based on the input information. The overlap information may identify nodes, of the plurality of nodes, that are associated with shared entities. A shared entity may be an entity that has performed transactions with at least two nodes of the plurality of nodes. The one or more instructions, when executed by one or more processors, may cause the one or more processors to generate, based on the input information and the overlap information, a predictive model to predict an effect of deactivating a particular node of the plurality of nodes. The particular node, when deactivated, may be unavailable to perform transactions. The one or more instructions, when executed by one or more processors, may cause the one or more processors to select a selected node, of the plurality of nodes, to potentially deactivate. The one or more instructions, when executed by one or more processors, may cause the one or more processors to determine a predicted effect of deactivating the selected node based on the predictive model and based on a particular quantity of shared entities associated with the selected node. The one or more instructions, when executed by one or more processors, may cause the one or more processors to store or provide information describing the predicted effect.

According to some possible implementations, a method may include receiving, by a device, first information describing a plurality of nodes and transactions associated with the plurality of nodes. The transactions may be between nodes, of the plurality of nodes, and entities of a plurality of entities. The method may include determining, by the device, second information based on the first information. The second information may identify nodes, of the plurality of nodes, that are associated with shared entities. A shared entity may be an entity that has performed transactions with at least two nodes of the plurality of nodes. The method may include generating, by the device, a geographical network that includes the at least two nodes. The geographical network may be generated based on geographical locations of the plurality of nodes and based on the second information. The method may include selecting, by the device, a selected node, of the at least two nodes, on which to perform an action. The method may include determining, by the device, third information based on predicting future performance of the at least two nodes assuming that the action is performed. The method may include storing or providing, by the device, the third information.

BRIEF DESCRIPTION OF THE DRAWINGS

FIG. 5 is a flow chart of an example process for predicting an effect of deactivating a node in a geographical network.

DETAILED DESCRIPTION

Figure 1A:
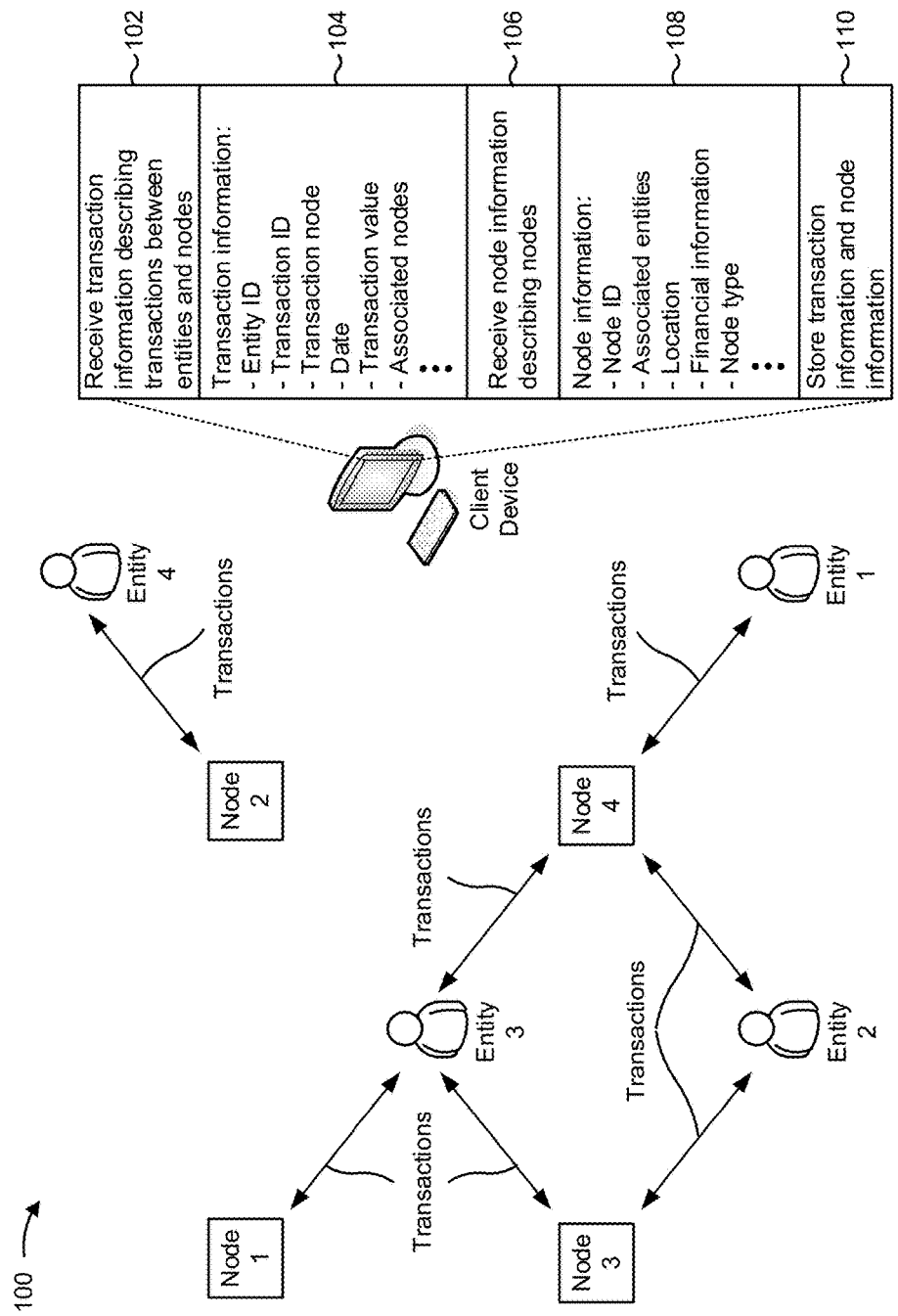
FIGS. 1A-1D are diagrams of an overview of an example implementation described herein.

The following detailed description of example implementations refers to the accompanying drawings. The same reference numbers in different drawings may identify the same or similar elements.

A set of nodes may perform transactions with entities. The nodes may include, for example, retail stores, bank branches, kiosks, computing stations, vendors, pharmacies, online stores, salespersons, or any other venue that offers a good or service for purchase or rental. The entities may include customers, clients, patients, or any other party that can perform a transaction with a node. Some of the nodes may be distributed in a geographic area. For example, the nodes may correspond to branches of a retail store, a consumer bank, or the like, and the entities (e.g., customers, clients, etc.) may purchase goods or services from one or more of the nodes. In some cases, a node may correspond to an online store, an e-commerce venue, or the like.

Some nodes, of the set of nodes, may perform better than other nodes, of the set of nodes, with regard to a particular metric. For example, a well-performing node may achieve a higher profitability margin, may attract more repeat transactions, may generate a more consistent sales volume, may achieve a higher operating margin, or the like as compared to an underperforming node. To improve performance of the set of nodes, a party that implements the set of nodes may perform an action with regard to a selected node. For example, the party may deactivate an underperforming node (e.g., may close underperforming retail stores, may shut down underperforming computing stations, etc.), may activate other nodes near the underperforming node, may change a capacity of the selected node, or the like.

It may be difficult to predict an effect of performing an action on a selected node with regard to other nodes associated with the selected node. For example, the party that implements the set of nodes may want to know what quantity of entities, associated with the selected node, would perform transactions with a different node if the selected node is deactivated. As another example, the party may want to predict effects or outcomes of the action with regard to neighboring nodes (e.g., profitability effects, transaction quantity effects, etc.). However, predicting such effects or outcomes may be difficult due to a quantity of data to be processed when predicting such effects, due to the presence of many confounding variables, or the like.

Implementations described herein use transaction information describing transactions and node information describing a set of nodes to predict an effect or outcome of performing an action with regard to one or more of the nodes. Implementations described herein may group the set of nodes into a geographical network based on geographical proximity and based on identifying nodes, of the set of nodes, that have performed transactions with the same entity or set of entities. By grouping the set of nodes into the geographical network, implementations described herein enable more accurate prediction of effects such as transfer of entities between nearby nodes, effects of deactivating a node on nearby nodes, or the like.

Further, grouping nodes into a geographical network may reduce a quantity of nodes to be processed to predict the effects of an action. For example, processing each node, of a set of nodes, may require significant processor resources. By dividing the set of nodes into geographical networks, and by processing nodes associated with one of the geographical networks, implementations described herein conserve processor resources that would otherwise be used to process each node of the set of nodes.

Still further, implementations described herein may generate one or more predictive models based on transaction information and node information relating to each of the set of nodes. Implementations described herein may use the one or more predictive models to suggest an action to perform with regard to a node based on predicting an effect of performing the action. In this way, implementations described herein improve performance of a set of nodes and enable analysis of entity transaction information for entities transacting with geographically separated nodes.

While implementations described herein are described primarily in the context of selecting nodes for deactivation and simulating an effect of deactivating the nodes, implementations described herein are not limited to selecting nodes for deactivation and simulating the deactivation of nodes. For example, implementations described herein may be used to select inactive nodes for activation and to predict an effect of activating the inactive nodes. As another example, implementations described herein may be used to predict an effect of changing a capacity of one or more nodes, to predict an effect of changing a price charged at one or more nodes, to predict an effect of changing geographical locations of one or more nodes, to predict an effect of modifying operational hours of one or more nodes, or the like.

FIGS. 1A-1D are diagrams of an overview of an example implementation 100 described herein. As shown in FIG. 1A, and by reference number 102, a client device may receive transaction information relating to a set of nodes. For example, each node, of the set of nodes, may be associated with a corresponding node device, and the client device may obtain the transaction information from the node devices (e.g., periodically, based on a request, etc.). Additionally, or alternatively, the client device may receive the transaction information from a server device, based on a user input, or the like. The nodes may include retail store locations, branches, kiosks, point of sale devices, store servers, or any other device or party that can perform a transaction with an entity.

As shown by reference number 104, the transaction information may include entity identifiers that identify an entity associated with each transaction, a transaction identifier, a transaction node (e.g., a node at which the transaction was performed), a transaction value (e.g., a dollar value, a time value, etc.), a date on which the transaction was performed, other nodes with which the entity is associated or with which the entity has performed a transaction, or the like. In some cases, the entity transaction information may include, for example, particular products that were purchased in a transaction, a service offered to and/or used by the entity, a date of the transaction, or the like.

As shown, some entities, such as Entity 1 and Entity 4, may perform transactions with a single node, such as Node 2 and Node 4, respectively. As further shown, other entities, such as Entity 2 and Entity 3, may perform transactions with multiple, different nodes. Entities that perform transactions with at least two nodes may be referred to herein as shared entities. The client device may use overlap information identifying shared entities to assign nodes to geographical networks and to predict an effect of performing an action with regard to a particular node, as described in more detail below.

As shown by reference number 106, the client device may receive node information corresponding to the set of nodes. For example, the client device may obtain the node information from the node devices, may receive the node information as a user input, may obtain the node information from a server device, or the like. As shown by reference number 108, the node information for a particular node may include a node identifier that identifies the particular node, information identifying entities that are associated with the particular node, information identifying a location of the particular node (e.g., a geographical location), financial information associated with the particular node (e.g., revenue information, operating margin information, profit information, tax information, payroll information, expense information, etc.), a node type (e.g., online store, brick-and-mortar store, mall kiosk, strip mall store, salesperson, lifestyle store, etc.), information indicating whether the node is active or inactive (e.g., deactivated), or other information.

As shown by reference number 110, the client device may store the transaction information and the node information. In some implementations, the client device may process the transaction information to identify transaction patterns, to remove outliers, or the like, as described in more detail in connection with FIGS. 4A and 4B, below.

Figure 1B:
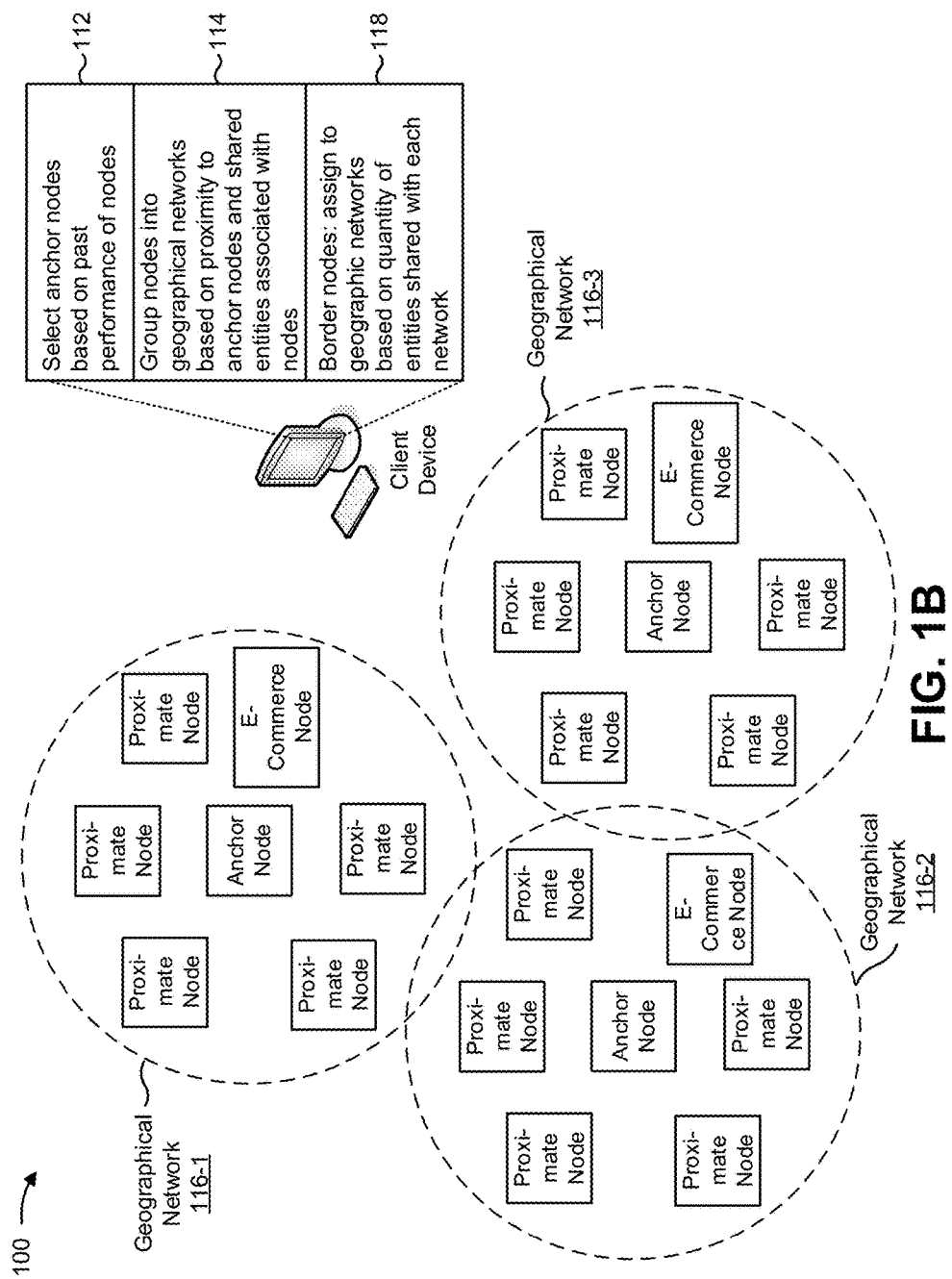

As shown in FIG. 1B, and by reference number 112, the client device may select one or more of anchor nodes from a set of nodes. As shown, the client device may select nodes as anchor nodes based on past performance of the set of nodes. For example, the set of nodes may be associated with respective performance values describing the past performance of the set of nodes. The performance value may include any value based on which the set of nodes is to be sorted or ranked (e.g., profitability, sales volume, average time per transaction, customer loyalty, operating margin, etc.). As an example, when the set of nodes includes retail store locations, the performance value may identify profitability of each retail store location, an operating margin of each retail store location, or the like. In some implementations, the performance value may be determined based on a combination of multiple, different values, and/or based on a predictive model as described in more detail in connection with FIGS. 4A and 4B, below.

As shown by reference number 114, the client device may group nodes, of the set of nodes, into geographical networks. Here, the nodes are grouped into geographical networks 116-1, 116-2, and 116-3. As further shown, the client device may group the nodes into geographical networks based on proximity to the anchor nodes and based on information describing shared entities associated with the nodes. For example, nodes that are within a particular distance of an anchor node of a particular geographical network 116 may be referred to as proximate nodes in relation to the anchor node.

The client device may selectively add a proximate node to geographical network 116 based on whether the proximate node is associated with a threshold quantity of shared entities that are also associated with nodes included in geographical network 116. For example, the client device may add a proximate node to geographical network 116 when a particular ratio of entities, that have performed transactions with the proximate node, have also performed transactions with at least one other node of geographical network 116 (e.g., 30 percent, 50 percent, 70 percent, etc.). In some implementations, once a proximate node, of a set of nodes, is added to geographical network 116, the proximate node may not be added to any other geographical network.

As shown, some nodes, of geographical networks 116, may be e-commerce nodes. An e-commerce node may not be associated with a particular location in geographical network 116, and may be used to describe transactions by entities using an online store, an e-commerce outlet, or the like. An e-commerce node may be added to a particular geographical network based on other nodes included in the geographical network. For example, if a geographical network includes nodes corresponding to stores owned by a particular company, an e-commerce node corresponding to the particular company may be added to the geographical network.

As shown by reference number 118, when a node is a border node, the client device may select a geographical network 116 for the border node from two or more candidate geographical networks 116. A border node is a node that can be placed within two or more geographical networks 116 based on a geographical location of the border node. For example, the border node may be located within a particular distance of two different anchor nodes and, therefore, may be a proximate node with regard to both of the two different anchor nodes. The client device may assign the border node to a particular geographical network 116 based on respective quantities or percentages of shared entities associated with the border node and nodes of each of the candidate geographical networks 116. In this way, the border node is assigned to a geographical network 116 with which the border node shares more entities or a higher percentage of entities.

Figure 1C:
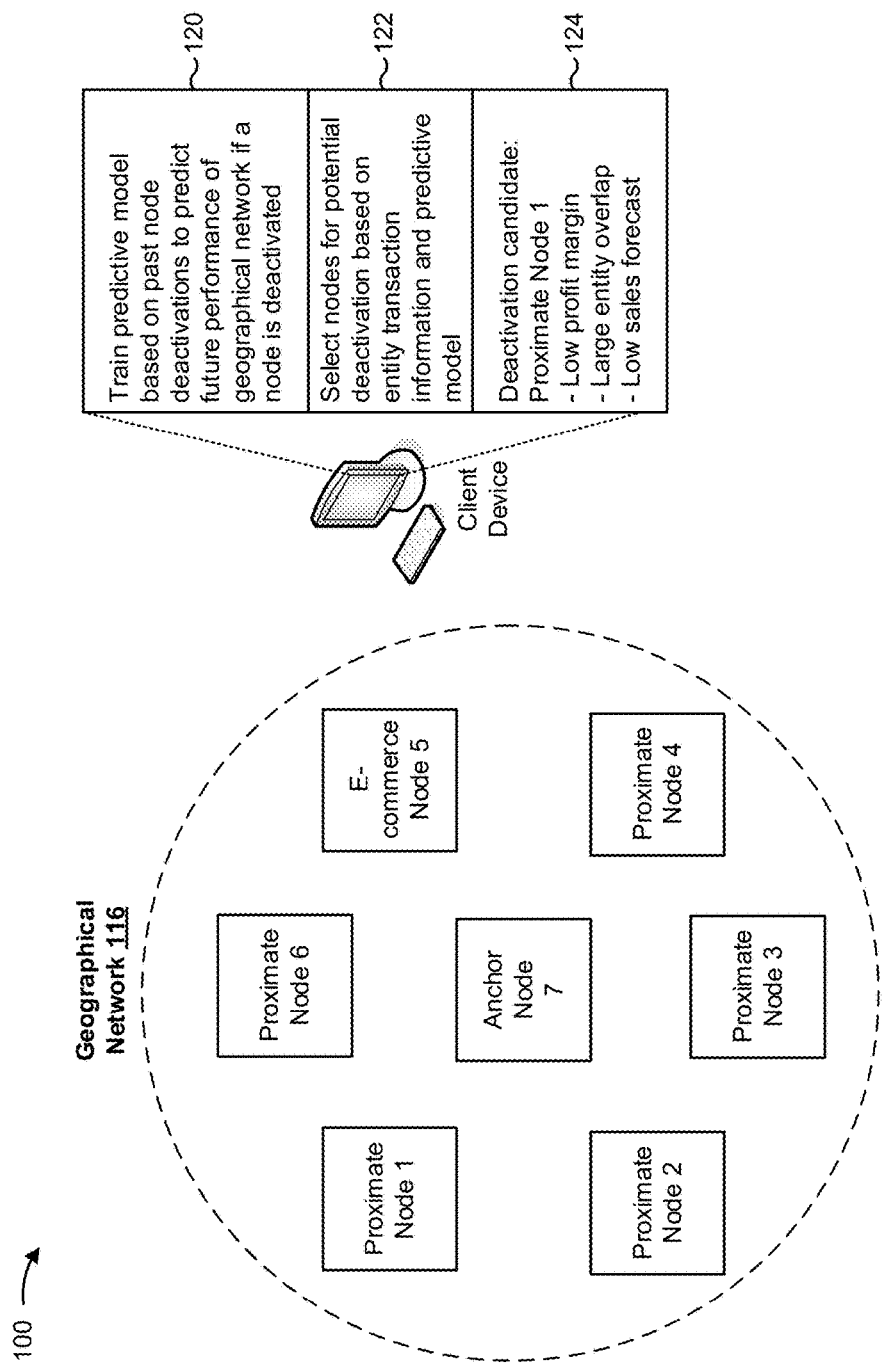

As shown in FIG. 1C, and by reference number 120, the client device may train a predictive model to predict future performance of geographical network 116 if a node of geographical network 116 is deactivated. For example, the predictive model may predict movement of entities and/or transactions from a deactivated node to other nodes, may predict a financial effect on remaining nodes, may predict a percentage of new entities that are predicted to perform transactions with remaining nodes, or the like. As further shown, the client device may train the predictive model based on past node deactivations. For example, the transaction information and node information may include information relating to previously deactivated nodes. The client device may use the information relating to the previously deactivated nodes and information relating to other nodes in geographical network 116 to train the predictive model.

As shown by reference number 122, the client device may select one or more nodes for deactivation based on the transaction information, the node information, and the predictive model. As shown by reference number 124, the client device selects Proximate Node 1 as a selected node based on Proximate Node 1 having a low profit margin and sales forecast (e.g., relative to other nodes in geographical network 116) and based on Proximate Node 1 having a large entity overlap value, indicating that Proximate Node 1 is associated with more shared entities than other nodes of geographical network 116. By selecting a node to be deactivated based on a quantity of shared entities, the client device increases a likelihood that entities associated with the node to be deactivated continue to perform transactions with other nodes of geographical network 116.

Figure 1D:
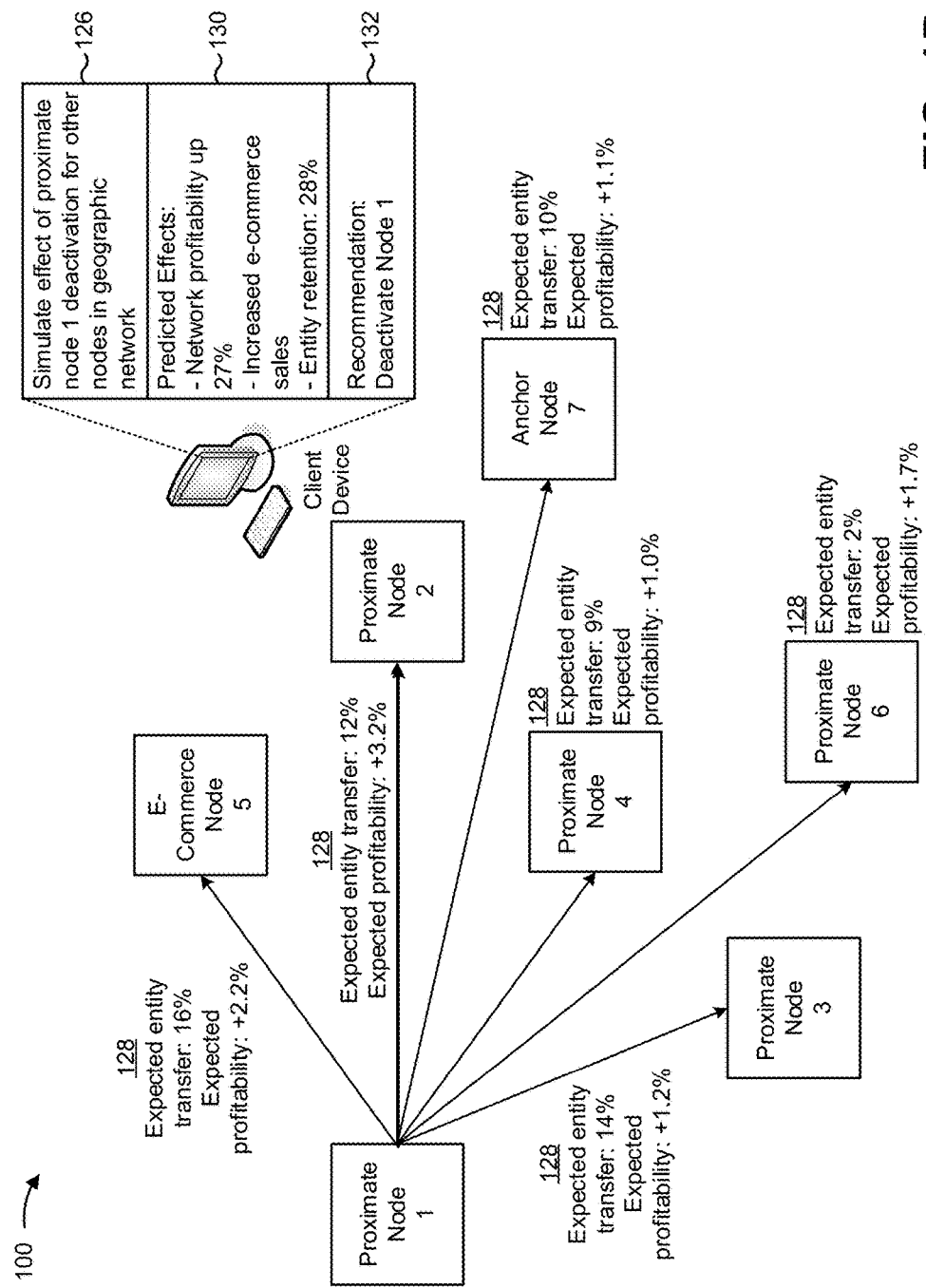

As shown in FIG. 1D, and by reference number 126, based on selecting Proximate Node 1 for potential deactivation, the client device may simulate an effect, on other nodes of geographical network 116, of deactivating Proximate Node 1. The client device may simulate the effect using the predictive model, and using transaction information and node information associated with the nodes of geographical network 116. As shown by reference number 128, the client device determines expected entity transfer rates and expected changes in profitability for each node in the geographical network. Here, for example, Proximate Node 2 is expected to receive 12 percent of the entities that have performed transactions at Proximate Node 1, and profitability of Proximate Node 2 is expected to increase by 3.2 percent.

As shown by reference number 130, the client device predicts outcomes and/or effects relating to geographical network 116 based on the simulation. Here, the client device determines that network profitability is expected to increase by 27 percent, that e-commerce sales are expected to increase, and that 28 percent of entities associated with Proximate Node 1 are expected to be retained in geographical network 116 after Proximate Node 1 is deactivated. As shown by reference number 132, based on the outcomes, the client device recommends to deactivate Proximate Node 1. In some implementations, the client device may perform another action based on the outcomes. For example, the client device may cause a node device associated with Proximate Node 1 to deactivate, may perform a simulation for another node of geographical network 116, may prepare a report describing the results of the simulation, or the like.

In this way, the client device selects a node for deactivation based on predictions regarding entity behavior when the node is deactivated, which improves retention of entities and which saves resources that are otherwise used to operate the node. Furthermore, the client device selects the node based on geographical information relating to the node and other nearby nodes, which reduces a quantity of nodes to be processed, thereby conserving processor resources. For example, rather than selecting the node based on an analysis of all nodes in an area, the client device may select the node based on analyzing a set of nodes that is associated with a particular geographical network, thereby conserving processor resources by not analyzing nodes not included in the geographical network.

As indicated above, FIGS. 1A-1D are provided merely as an example. Other examples are possible and may differ from what was described with regard to FIGS. 1A-1D.

Figure 2:
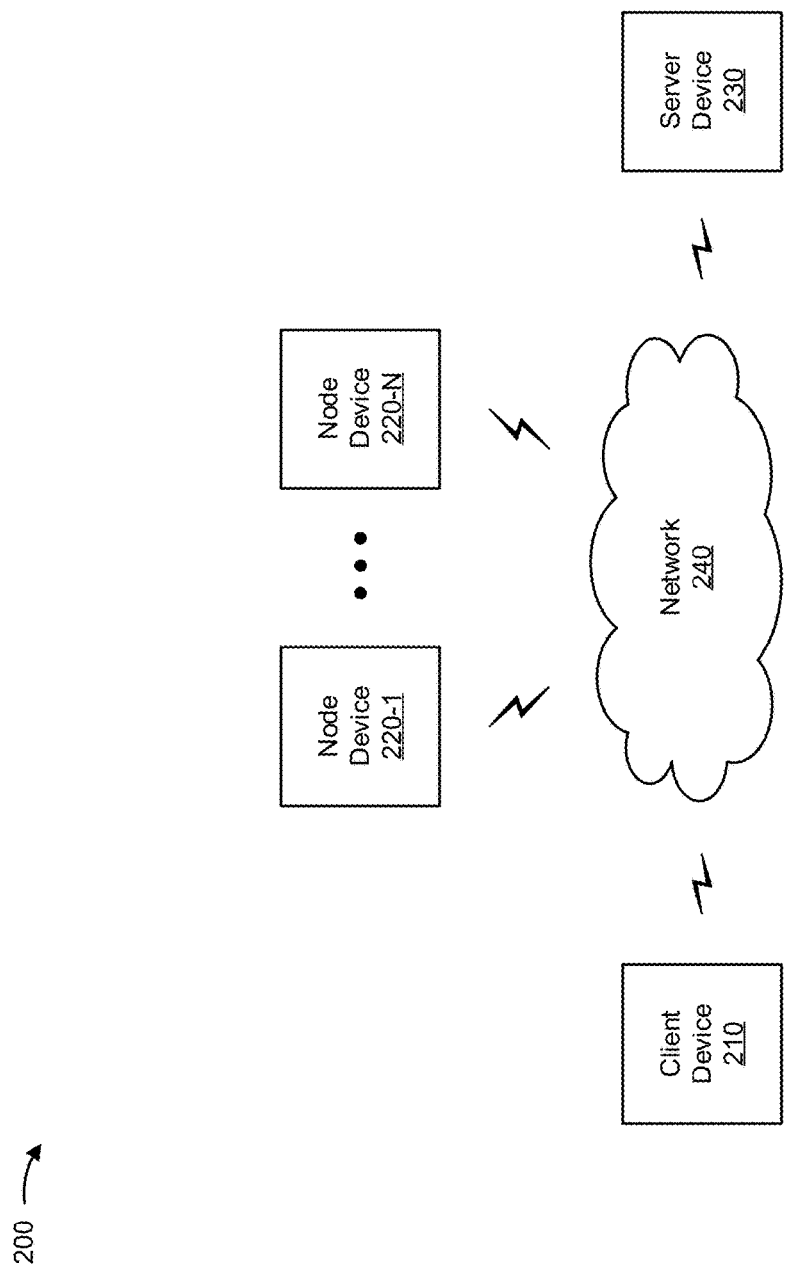
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, one or more node devices 220-1 through 220-N (N≥1) (hereinafter referred to collectively as "node devices 220," and individually as "node device 220"), a server device 230, and a network 240. Devices of environment 200 may interconnect via wired connections, wireless connections, or a combination of wired and wireless connections.

Client device 210 includes one or more devices capable of receiving, generating, storing, processing, and/or providing information. For example, client device 210 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. In some implementations, client device 210 may receive information from and/or transmit information to another device in environment 200, such as node device 220 or server device 230. In some implementations, client device 210 may include a cloud device, such as a server, a group of servers, a distributed computing platform, or the like.

Node device 220 includes one or more devices capable of receiving, generating, storing, processing, and/or providing information. For example, node device 220 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), a point of sale terminal, or a similar type of device. In some implementations, node device 220 may receive information from and/or transmit information to another device in environment 200, such as client device 210 or server device 230.

Server device 230 includes one or more devices capable of storing, processing, and/or routing information. In some implementations, server device 230 may include a communication interface that allows server device 230 to receive information from and/or transmit information to other devices in environment 200, such as client device 210 or node device 220.

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
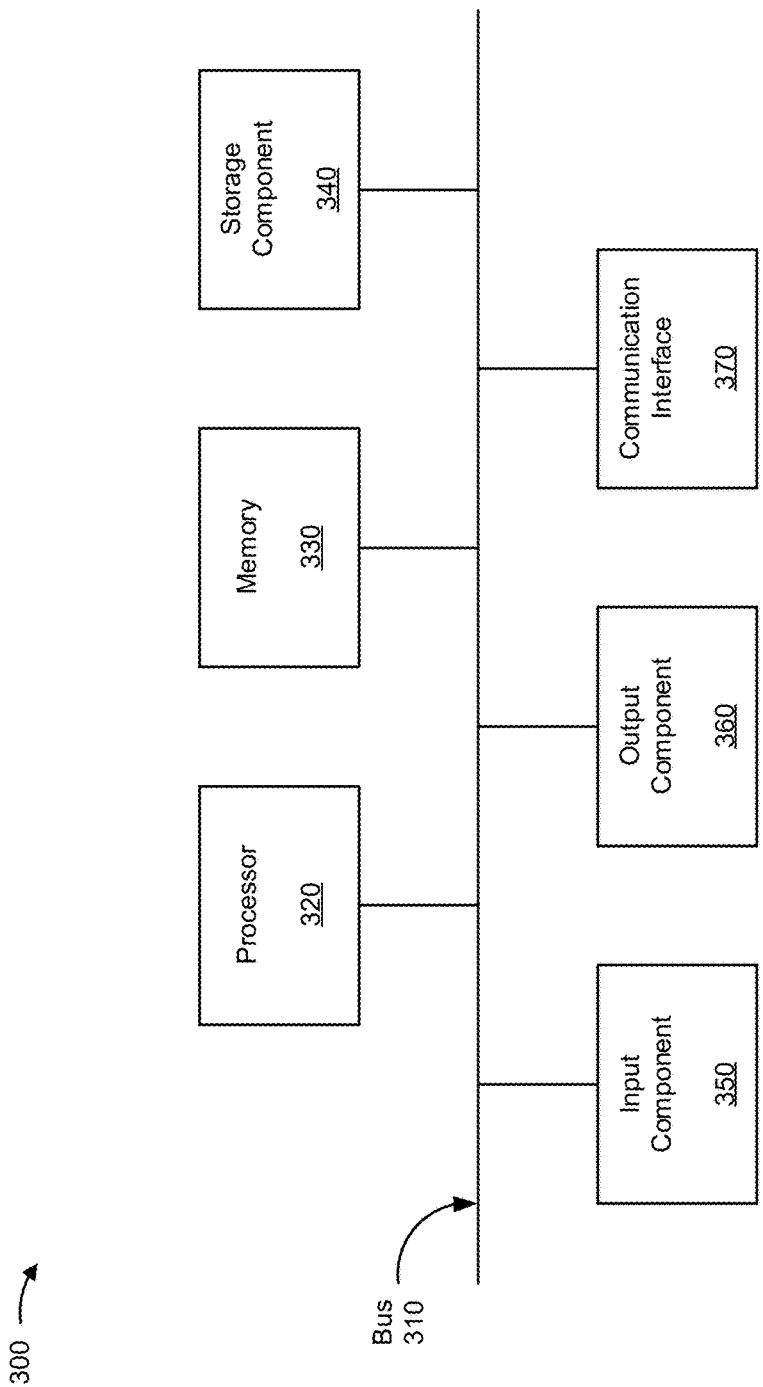
FIG. 3 is a diagram of example components of one or more devices of FIG. 2.

FIG. 3 is a diagram of example components of a device 300. Device 300 may correspond to client device 210, node device 220, and/or server device 230. In some implementations, client device 210, node device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
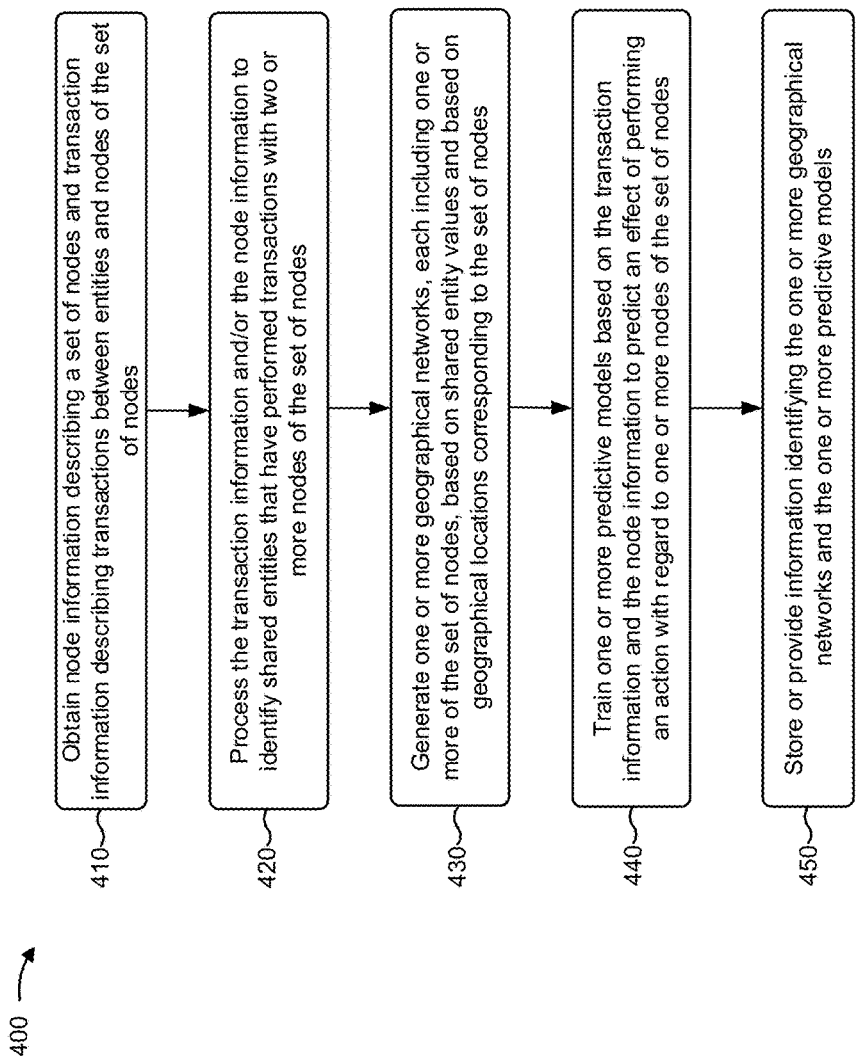
FIGS. 4A and 4B are flow charts of an example process for grouping nodes into geographical networks and training one or more predictive models relating to the nodes.
Figure 4B:
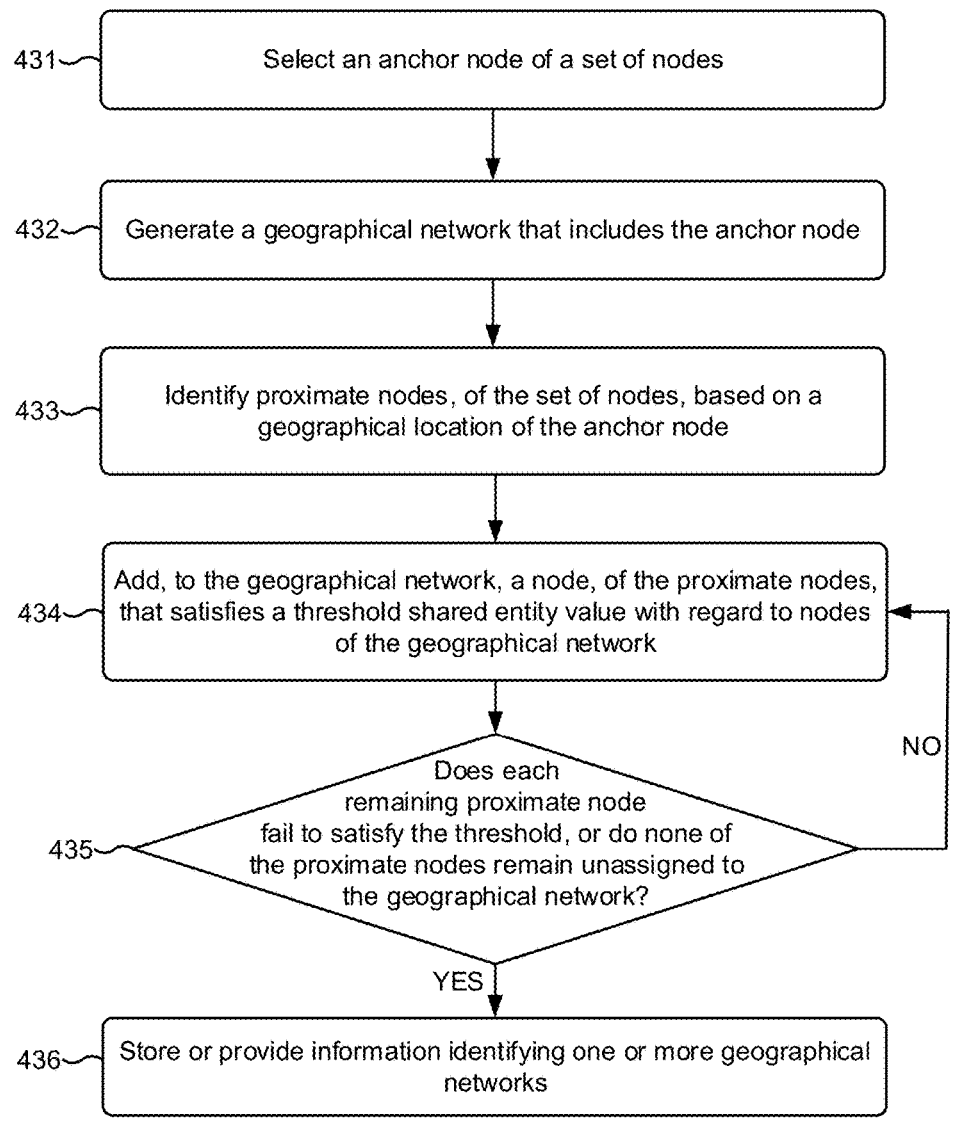

FIGS. 4A and 4B are flow charts of an example process 400 for grouping nodes into geographical networks and training one or more predictive models relating to the nodes. In some implementations, one or more process blocks of FIGS. 4A and 4B may be performed by client device 210. In some implementations, one or more process blocks of FIGS. 4A and 4B may be performed by another device or a group of devices separate from or including client device 210, such as node device 220 and server device 230.

As shown in FIG. 4A, process 400 may include obtaining node information describing a set of nodes and transaction information describing transactions between entities and nodes of the set of nodes (block 410). For example, client device 210 may obtain transaction information and node information relating to a set of nodes. In some implementations, client device 210 may obtain the transaction information and/or node information from node devices 220 corresponding to the set of nodes. For example, node devices 220 may store transaction information and/or node information for corresponding nodes, and may provide the transaction information and/or node information to client device 210 (e.g., periodically, in a continuous stream, based on receiving a request from client device 210, etc.). In some implementations, client device 210 may receive the transaction information and/or node information from another source, such as from a user of client device 210, from server device 230, or the like.

The transaction information may include information describing transactions performed by one or more nodes with regard to one or more entities. A transaction may include a sale of goods and/or services by a node to an entity, a rental of goods by an entity from a node, a logon to a node by an entity, or any other transfer of value from an entity to a node or from a node to an entity. As one possible example, a node may include a brick-and-mortar store, and entities may perform transactions with the node to purchase goods from the brick-and-mortar store.

In some implementations, the transaction information may include information describing an entity, such as an entity identifier, demographic information (e.g., an age of the entity, an ethnicity of the entity, an income level of the entity, a marital status of the entity, an education level of the entity, preferences expressed by the entity, etc.), purchasing habits of the entity, a geographical location associated with the entity (e.g., an address, a geographical area in which the entity has performed transactions, etc.), financial objectives associated with the entity, information identifying one or more nodes with which the entity has performed transactions, account information associated with the entity, goods, and/or services purchased by the entity, online services used by the entity, payment information associated with the entity, an average sales per day value associated with the entity, or the like.

In some implementations, the transaction information may include information describing a transaction, such as an entity and a node associated with the transaction, a transaction identifier, a value of the transaction (e.g., a monetary value paid by the entity, a time value associated with a service provided to the entity, etc.), a payment type associated with the transaction (e.g., credit card, cash, gift card, online payment, etc.), a transaction type (e.g., in-store, online, over-the-phone, store-pickup, mail-order, etc.), or the like.

The node information may include information describing a node and/or a set of nodes. For example, the node information may identify performance information for a node (e.g., revenue, gross profit, net profit, a profit margin, a quantity of sales, a quantity of transactions, etc.), a quantity of employees associated with the node, expenses associated with the node, variable costs associated with the node, a type associated with the node (e.g., a brick-and-mortar store, an online or e-commerce store, a kiosk, an outlet store, a store in a mall, a branch, a headquarters location, a drive-thru, etc.), a geographical location associated with the node, a distance and/or travel time from one or more other nodes, goods and/or services offered at the node, a quantity of entities that have performed transactions with the node (e.g., in the last month, in the last year, during the life of the node, etc.), a quantity of entities that regularly perform transactions with the node, information related to future performance of the node (e.g., payroll growth information, net income growth information, profit growth information, etc.), information related to a market in which the node operates (e.g., market growth information, market capitalization information, a quantity of entities associated with the market, etc.), or the like.

In some implementations, client device 210 may determine or receive information to be associated with transaction information and/or node information. For example, client device 210 may receive location information to be associated with one or more nodes (e.g., from a geographic information system, from node device 220, etc.), and client device 210 may associate the location information with the one or more nodes. As another example, client device 210 may determine that information is missing or corrupted, and may determine information to replace the missing or corrupted information (e.g., based on information related to the missing or corrupted information, based on a default value for the missing or corrupted information, based on querying node device 220 for the missing or corrupted information, based on cross-referencing transaction information against node information to determine the missing or corrupted information, based on a user input to client device 210, etc.).

In some implementations, client device 210 may receive competitor information relating to competitors, and may associate the competitor information with the transaction information and/or the node information. For example, assume that a set of nodes is located in a geographical area, and assume that the set of nodes is associated with a set of entities. Competitor information, relating to the set of nodes and/or the set of entities, may identify competitors in the geographical area (e.g., competitor nodes, located in the geographical area, with which the entities may perform transactions), locations of the competitors, a market share of the competitors, a percentage of transactions and/or spending by the set of entities with regard to the competitors as compared to the one or more nodes, or the like. Client device 210 may receive the competitor information, and may associate the competitor information with the set of nodes and/or the set of entities.

As further shown in FIG. 4A, process 400 may include processing the transaction information and/or the node information to identify shared entities that have performed transactions with two or more nodes of the set of nodes (block 420). For example, some entities may perform transactions with multiple, different nodes, and may be referred to herein as shared entities. When a particular node associated with shared entities is deactivated, the shared entities may be more likely to perform transactions with other nodes than an entity that has performed transactions only with the particular node. Client device 210 may process the transaction information and the node information to identify which entities have performed transactions with multiple nodes.

To identify the shared entities, client device 210 may identify entities that are associated with transactions at two or more nodes. In some implementations, client device 210 may determine a percentage of shared entities that are shared between each node of a set of nodes. For example, assume that a first node, a second node, and a third node have collectively performed transactions with 2,000 entities. Assume further that 500 entities, of the 2,000 entities, have performed at least one transaction with each of the first node, the second node, and the third node. In that case, client device 210 may determine that the first node, the second node, and the third node are associated with 500 shared entities, and may determine overlap information indicating that 25% of entities associated with the first node, the second node, and the third node are shared entities. Additionally, or alternatively, client device 210 may perform a similar operation with regard to performance information, revenue information, sales information, profit information, or another metric.

In some implementations, client device 210 may identify a transaction pattern in the transaction information and/or the node information. A transaction pattern may identify a pattern in transaction information and/or node information relating to transactions at one or more nodes. For example, client device 210 may identify a transaction pattern indicating that an entity is a bulk reseller (e.g., based on a particular quantity of transactions of a threshold amount performed during a particular period of time), and may store information indicating that the entity is a bulk reseller. Bulk reseller entities may be more likely to be retained as customers when a corresponding node is deactivated than entities that are not bulk resellers. Client device 210 may use information identifying bulk resellers to predict an effect of deactivating nodes associated with the bulk resellers, as described in more detail below.

As another example of a transaction pattern, client device 210 may identify all entities that are new entities (i.e., that have not previously performed a transaction with any node of a set of nodes), and may identify transaction patterns with regard to a quantity of the new entities using each node of the set of nodes, with regard to transaction values associated with the new entities, or the like. As yet another example, client device 210 may determine that entities that use a particular payment type (e.g., a particular brand of credit card, a cash payment type, etc.) are more likely than other entities to be retained as customers, and may identify a transaction pattern relating to the entities and the particular payment type. Client device 210 may use the transaction patterns to improve accuracy of information generated using predictive models, as described in more detail below.

In some implementations, client device 210 may process the transaction information and/or node information to improve accuracy of predictive models that use the transaction information and/or node information. For example, client device 210 may remove outliers from the transaction information and/or node information. As another example, client device 210 may remove entities that have performed no transactions in a particular period of time from the transaction information. As yet another example, in some implementations, client device 210 may remove information relating to bulk resellers from the transaction information (e.g., in a situation where the one or more predictive models are to be trained based on past behavior of consumer entities).

In some implementations, client device 210 may remove highly correlated independent variables (e.g., multi-collinear variables). For example, when two or more attributes of transaction information and/or node information are highly correlated, the two or more attributes may reduce accuracy of predicted effects or outcomes involving one or more of the two or more attributes. Client device 210 may remove multi-collinear variables, for example, based on a variance inflation factor that identifies a magnitude of collinearity of variables. For example, when the variance inflation factor of a set of variables satisfies a particular threshold, client device 210 may remove one or more of the variables of the set. In this way, client device 210 improves accuracy of predicted effects and outcomes generated by predictive models using the transaction information and/or node information, and conserves processor power that would otherwise be used to process multi-collinear variables.

Process 400 may further include generating one or more geographical networks, each including one or more of the set of nodes, based on shared entity values and based on geographical locations corresponding to the set of nodes (block 430). Turn now to FIG. 4B, which shows an example process 430 for generating the one or more geographical networks. A geographical network may include a group of nodes that are located within a particular geographical area and/or that have a common characteristic. For example, a geographical network may include a group of nodes that are each located within a particular distance of an anchor node, and that share a threshold quantity or ratio of shared entities with the anchor node and/or with each other.

As shown in FIG. 4B, process 430 may include selecting an anchor node of a set of nodes (block 431). For example, client device 210 may receive or obtain information describing a set of nodes, and may select one of the set of nodes as an anchor node for a geographical network. Client device 210 may select the anchor node based on the anchor node being a highest-performing node of the set of nodes, based on the anchor node being located in a particular location, based on the anchor node being selected by a user, based on a random selection, or the like. In some implementations, client device 210 may select the anchor node based on node information and/or transaction information associated with the anchor node, such as a profitability indicator, a quantity of transactions performed, an efficiency rating of the anchor node, a quantity of entities associated with the anchor node, or the like.

As further shown in FIG. 4B, process 430 may include generating a geographical network that includes the anchor node (block 432). For example, client device 210 may generate a geographical network that includes the anchor node, or may add the anchor node to a geographical network. Information identifying the geographical network may be stored in a data structure, such as a spreadsheet, a directed graph, or the like. In some implementations, client device 210 may generate multiple geographical networks corresponding to multiple anchor nodes. For example, client device 210 may select a set of anchor nodes, and may generate a corresponding set of geographical networks. As used herein, "generating a geographical network" refers to the process of selecting nodes to be grouped based on shared entity values. For example, information identifying a geographical network may identify a set of nodes included in the geographical network and/or locations of the set of nodes.

As further shown in FIG. 4B, process 430 may include identifying proximate nodes, of the set of nodes, based on a geographical location of the anchor node (block 433). For example, client device 210 may identify proximate nodes of the set of nodes. A proximate node may include a node that is located within a particular distance from the anchor node (e.g., 500 meters, 1 kilometer, 10 kilometers, 100 kilometers, or any other distance). In some implementations, client device 210 may identify the proximate nodes based on another metric, such as a driving time from the anchor node, a geographical boundary (e.g., a city border, a county border, a state border, a country border, etc.), a selection of the proximate nodes by a user of client device 210, a node type associated with the proximate nodes, or the like.

As further shown in FIG. 4B, process 430 may include adding, to the geographical network, a node, of the proximate nodes, that satisfies a threshold shared entity value with regard to nodes of the geographical network (block 434). For example, client device 210 may identify a node, of the proximate nodes, that is associated with a threshold shared entity value with regard to the anchor node. Client device 210 may add the node to the geographical network. For example, client device 210 may store information indicating that the node is associated with the geographical network, may add a node identifier associated with the node to a data structure describing the geographical network, or the like.

In some implementations, the threshold shared entity value may be based on a percentage of entities and/or transactions associated with the node or nodes of the geographical network. That is, client device 210 may add a proximate node to the geographical network when a particular percentage of the shared entities associated with the proximate node are associated with one or more of the nodes of the geographical network. As another example, assume that the node or nodes of the geographical network are associated with a percentage of shared entities as compared to a total quantity of entities associated with the node or nodes of the geographical network. In such a case, client device 210 may add a proximate node to the geographical network when client device 210 determines that adding the proximate node would increase the percentage of shared entities associated with the geographical network.

As further shown in FIG. 4B, process 430 may include determining whether each remaining proximate node fails to satisfy the threshold, or none of the proximate nodes remain unassigned to the geographical network (block 435). For example, when one or more proximate nodes remain unassigned to the geographical network, client device 210 may determine whether each remaining proximate node fails to satisfy the threshold shared entity value. Client device 210 may continue to iteratively add the proximate nodes to the geographical network until none of the proximate nodes satisfies the threshold shared entity value, or until no proximate node remains unassigned to the geographical network.

When one or more of the proximate nodes remain unassigned to the geographical network or when a remaining proximate node satisfies the threshold (block 435—NO), process 430 may include returning to block 434. That is, while a proximate node remains unassigned to the geographical network, client device 210 may determine whether the proximate node satisfies the threshold shared entity value. If the proximate node satisfies the threshold shared entity value, client device 210 may add the proximate node to the geographical network.

In some implementations, client device 210 may add proximate nodes to the geographical network in a particular order. For example, assume that a first proximate node, a second proximate node, and a third proximate node are associated with shared entity values of 85%, 80%, and 75%, respectively, and assume that each of the shared entity values satisfies a threshold shared entity value. The shared entity values may identify a ratio of shared entities associated with the corresponding proximate node and the geographical network to entities associated with the corresponding proximate node that are not shared. In some implementations, client device 210 may first assign, to the geographical network, a proximate node with a highest shared entity value (i.e., the first proximate node). In such cases, client device 210 may continue to assign proximate nodes to the geographical network based on a highest shared entity value (e.g., may assign the second proximate node to the geographical network, then the third proximate node). Additionally, or alternatively, client device 210 may assign the proximate nodes to the geographical network based on distance from the anchor node of the geographical network, based on performance of the proximate nodes, or based on another metric.

When each remaining proximate node fails to satisfy the threshold or when none of the proximate nodes remain unassigned to the geographical network (block 435—YES), process 430 may include providing information identifying one or more geographical networks (block 436), and proceeding to block 440 of FIG. 4A. For example, in a situation where each of the proximate nodes has been assigned to the geographical network, client device 210 may determine that the geographical network is complete, and may proceed to generate one or more predictive models. Additionally, or alternatively, when each remaining proximate node does not satisfy the threshold shared entity value, client device 210 may determine that the geographical network is complete, and may proceed to generate one or more predictive models based on the nodes of the geographical network and/or one or more other nodes not included in the geographical network.

In some implementations, client device 210 may generate multiple geographical networks. For example, assume that five nodes, of a set of fifty nodes, are added to a geographical network associated with a first anchor node. In that case, client device 210 may identify a second anchor node from the remaining forty-five nodes of the set, and may perform the above steps with regard to other nodes of the remaining forty-five nodes (i.e., may identify proximate nodes and may selectively add the proximate nodes to the geographical network associated with the second anchor node based on a threshold shared entity value). Client device 210 may continue to iteratively generate geographical networks until each of the fifty nodes has been added to a geographical network. In a situation where a proximate node for a particular geographical network is not added to the particular geographical network, client device 210 may return the proximate nodes to the set of nodes available to be added to the next geographical network.

In this way, client device 210 iteratively generates geographical networks to which nodes may be added. The geographical networks are generated based on a shared entity value among nodes of the geographical networks, thereby causing nodes of a particular geographical network to be likely to share entities amongst the nodes of the particular geographical network. By grouping nodes based on shared entity values, client device 210 simplifies prediction of effects of performing actions on entities in a particular geographical network. Furthermore, client device 210 reduces processor usage by reducing a quantity of nodes to analyze for the particular geographical network.

Returning now to FIG. 4A, after generating one or more geographical networks, process 400 may include training one or more predictive models based on the transaction information and the node information to predict an effect of performing an action with regard to one or more nodes of the set of nodes (block 440). For example, client device 210 may train one or more predictive models based on the transaction information and the node information. A predictive model may include a regression-based model, a discrete choice model, a classification tree-based model, a machine-learning model, a neural network, or a similar type of model. The predictive model may receive known information as an input (e.g., transaction information, node information, and/or information specifying one or more selected nodes for which an action is to be performed) and may output information describing a predicted effect or outcome based on the known information.

In some implementations, client device 210 may train a predictive model based on an algorithm, such as a machine learning algorithm, a neural networking algorithm, or the like. For example, client device 210 may use input information with known attributes and known outcomes, such as transaction information and/or node information pertaining to nodes that have previously been deactivated, to train the predictive model. Client device 210 may identify a relationship between the known attributes and the known outcomes, and may configure the predictive model based on the relationship. As one example, the input information may include transaction information and node information relating to a geographical network in which one or more deactivated nodes have been deactivated. The known outcomes may describe movement of entities to nodes other than the deactivated nodes, an effect on net profit of nodes other than the deactivated nodes, an effect over a period of time on sales of the nodes other than the deactivated nodes, or the like.

When client device 210 inputs, to the predictive model, node information and/or transaction information that is associated with a node to be deactivated, the predictive model may output, based on the node information and/or transaction information and the relationship between input information and output information, a predicted effect or outcome of deactivating the node. In this way, client device 210 configures a predictive model using an algorithm, which conserves organizational time and money that are otherwise used to configure rules for predicting outcomes of node deactivations.

In some implementations, client device 210 may test and/or update the predictive model based on input information that is associated with known outcomes. For example, client device 210 may train the predictive model based on first input information (i.e., first transaction information and/or node information) pertaining to first deactivated nodes, and may test or update the predictive model based on second input information (e.g., second transaction information and/or node information) pertaining to second deactivated nodes. The second input information may be received substantially simultaneously with the first input information (e.g., in a batch with the first input information), or may be received at a different time than the first input information.

To test or update the predictive model, client device 210 may input the second input information to the predictive model. Based on attributes of the second input information, the predictive model may output predicted outcomes relating to the second deactivated nodes. If the predicted outcomes outputted by the predictive model do not match known outcomes relating to the second deactivated nodes, client device 210 may reconfigure the predictive model based on differences between the predicted outcomes and the known outcomes. For example, client device 210 may use a machine learning algorithm to configure the predictive model based on the second input information and based on the known outcomes. In this way, client device 210 conserves processor resources by improving accuracy of the predictive model. When accuracy of the predictive model is improved, client device 210 may more efficiently and accurately select nodes to deactivate, thereby conserving processor resources that would otherwise be used to simulate deactivation of additional nodes to find a satisfactory node to deactivate.

In some implementations, client device 210 may select the first deactivated nodes and the second deactivated nodes based on a date (e.g., the first deactivated nodes may include nodes deactivated before a particular date and/or time and the second deactivated nodes may include nodes deactivated after the particular date and/or time), based on types of nodes included in the first deactivated nodes and the second deactivated nodes, based on a user of client device 210 specifying the first deactivated nodes and the second deactivated nodes, based on information pertaining to the second deactivated nodes being received after information pertaining to the first deactivated nodes, or the like.

In some implementations, client device 210 may generate a retention model. A retention model may be a predictive model that receives input information relating to a selected node to be deactivated, and that outputs information predicting a percentage or quantity of entities, associated with the selected node, that will be retained as customers. In other words, the predictive model may predict a percentage or quantity of entities that will perform transactions with one or more other nodes of a geographical network that includes the selected node, after the selected node is deactivated. For example, assume that a node to be deactivated is included in a geographical network with three other nodes, and assume that the node to be deactivated is associated with 500 entities. The retention model may receive input information relating to the node and the three other nodes, the transactions performed with regard to the 500 entities, information identifying shared entities associated with the nodes of the geographical network, or the like. The retention model may output information identifying a quantity of the 500 entities with which each of the other three nodes is predicted to perform a transaction, an effect on profitability of each of the other three nodes, or the like.

The input information for the retention model may include, for example, a node type of the nodes in the geographical network (e.g., e-commerce, mall kiosk, mall anchor store, salesman, strip mall store, etc.), a driving distance and/or time from the node to be deactivated to other nodes in the geographical network, a size of a geographical area associated with the geographical network, a quantity of transactions between new entities and nodes that are not included in the geographical network, entity information (e.g., ethnicity, income group, transaction types, whether the entity is a bulk reseller, etc.), information relating to competitors in the geographical area associated with the geographical network, expected market growth in the geographical area associated with the geographical network, or the like.

In some implementations, client device 210 may generate an acquisition model. An acquisition model may be a predictive model that receives input information relating to a node to be deactivated in a geographical network. The acquisition model may output information predicting a quantity of new entities with which remaining nodes of the geographical network are likely to perform transactions. A new entity is an entity that has not previously performed a transaction with any node in a geographical network. For example, if nodes of the geographical network collectively perform transactions with 500 new entities per year, the acquisition model may predict a change in a quantity of new entities per year if one or more of the nodes of the geographical network are deactivated. Additionally, or alternatively, the acquisition model may predict a change in a quantity of new entities per year corresponding to each of the nodes of the geographical network.

The input information for the acquisition model may include, for example, a format of the nodes in the geographical network, a driving distance and/or time from the node to be deactivated to other nodes in the geographical network, a population density in the geographical area associated with the geographical network, demographic information for the geographical area, information relating to competitors in the geographical area associated with the geographical network, expected market growth in the geographical area associated with the geographical network, or the like.

In some implementations, client device 210 may generate an erosion model. An erosion model may include a predictive model that receives input relating to a node to be deactivated in a geographical network, and output information predicting an effect on transactions of other nodes in the geographical network based on passage of time. For example, in some cases, an entity may be likely to perform fewer transactions, or more transactions, as an age of the entity increases. The age of an entity may be defined as a length of time since a first transaction, by the entity, with a node of a geographical network. An erosion model may output an erosion value based on which to scale future revenue values, profit values, net receipts, quantities of transactions, etc. for nodes of a geographical network. For example, the erosion model may define a relationship that relates an age value of entities associated with a node (e.g., mean age, average age, median age, weighted average age, etc.), to the erosion value based on which to scale future revenue values, profit values, net receipts, quantities of transactions, etc. associated with the node.

The input information for the erosion model may include, for example, a date of an initial transaction for entities associated with a node, an age of entities associated with the node, an increase or decrease of a transaction metric based on age of an associated entity or set of entities, a rate of change of a transaction metric over time, or the like.

In some implementations, client device 210 may generate a predictive model based on nodes of multiple geographical networks. For example, client device 210 may generate a predictive model based on input information pertaining to a set of nodes across multiple geographical networks, which may reduce a quantity of predictive models to generate, thereby conserving processing power. In some implementations, client device 210 may generate a predictive model based on nodes of a particular geographical network, which improves accuracy of the predictive model with regard to the particular geographical network and which conserves processing power that would otherwise be used to train the predictive model with regard to nodes in other geographical networks than the particular geographical network.

In this way, client device 210 trains one or more predictive models to improve accuracy of predicted outcomes of performing an action with regard to one or more nodes. By training and updating the one or more predictive models, client device 210 improves accuracy of predicted values outputted by the one or more predictive models, thereby improving selection of selected nodes and thus conserving processor resources that would otherwise be used to analyze an increased quantity of selected nodes.

As further shown in FIG. 4A, process 400 may include storing or providing information identifying the one or more geographical networks and the one or more predictive models (block 450). For example, client device 210 may store or provide information identifying the one or more geographical networks and the one or more predictive models. In some implementations, client device 210 may provide the information to another device, such as node device 220 or server device 230. For example, node device 220 may store information relating to a geographical network that includes a node corresponding to node device 220, or the like.

In some implementations, server device 230 may store information describing the one or more geographical networks and the one or more predictive models. For example, in a situation where server device 230 generates the one or more geographical networks and/or the one or more predictive models, server device 230 may store information describing the one or more geographical networks and/or the one or more predictive models, which may conserve processor and storage resources of client device 210. Additionally, or alternatively, client device 210 may generate the one or more geographical networks and/or the one or more predictive models, and may provide information describing the one or more geographical networks and the one or more predictive models to server device 230 for storage, which may conserve storage space of client device 210.

Although FIGS. 4A and 4B show example blocks of processes 400 and 430, in some implementations, processes 400 and 430 may include additional blocks, fewer blocks, different blocks, or differently arranged blocks than those depicted in FIGS. 4A and 4B. Additionally, or alternatively, two or more of the blocks of processes 400 and 430 may be performed in parallel.

FIG. 5 is a flow chart of an example process 500 for predicting an effect of deactivating a node in a geographical network. In some implementations, one or more process blocks of FIG. 5 may be performed by client device 210. In some implementations, one or more process blocks of FIG. 5 may be performed by another device or a group of devices separate from or including client device 210, such as node device 220 and server device 230.

As shown in FIG. 5, process 500 may include receiving transaction information and node information corresponding to a set of nodes of a geographical network (block 510). For example, client device 210 may receive transaction information and node information corresponding to a set of nodes of a geographical network. In some implementations, client device 210 may receive the transaction information and the node information, and may generate one or more geographical networks, as described in more detail in connection with block 430 of FIGS. 4A and 4B. Additionally, or alternatively, client device 210 may obtain the transaction information, the node information, and/or information describing the one or more geographical networks from another device, such as node device 220 and/or server device 230.

In some implementations, client device 210 may store node information and transaction information relating to multiple geographical networks, and may select a particular geographical network, of the multiple geographical networks, to analyze. By selecting the particular geographical network to analyze, rather than analyzing each of the multiple geographical networks, client device 210 conserves processor resources. In some implementations, client device 210 may analyze multiple, different geographical networks (e.g., simultaneously, sequentially, etc.). For example, client device 210 may obtain transaction information and/or node information relating to a first geographical network, and may analyze the first geographical network. Client device 210 may then obtain transaction information and/or node information relating to a second geographical network, and may analyze the second geographical network. In this way, client device 210 analyzes multiple geographical networks sequentially, which reduces processor and storage usage of client device 210.

As further shown in FIG. 5, process 500 may include obtaining or generating one or more predictive models relating to the transaction information, the node information, and/or the geographical network (block 520). For example, in some implementations, client device 210 may receive or generate one or more predictive models, as described in more detail in connection with block 440 of FIG. 4A, above. In some implementations, the one or more predictive models may include a retention model, an acquisition model, an erosion model, or another type of predictive model.

In some implementations, client device 210 may obtain one or more predictive models from another device (e.g., node device 220 or server device 230), which conserves processor and storage resources of client device 210 as compared to a situation where client device 210 generates and/or stores the one or more predictive models. Client device 210 may use the one or more predictive models to select a selected node with regard to which to perform an action, and/or to predict an effect of the action on the geographical network, as described in more detail below.

In some implementations, client device 210 may obtain information outputted by one or more predictive models. For example, server device 230 may train the one or more predictive models and may use the one or more predictive models to determine output information relating to the set of nodes of the geographical network. The output information may include, for example, a predicted quantity of shared entities that would be retained assuming that a corresponding node is deactivated, a predicted quantity of new entities that would be acquired after a corresponding node is deactivated, or the like. Client device 210 may obtain, from server device 230, output information describing the set of nodes and/or the geographic network, which conserves processor and storage resources of client device 210 that would otherwise be used to determine the output information.

As further shown in FIG. 5, process 500 may include selecting, based on the one or more predictive models, one or more selected nodes, of the set of nodes, on which an action may be performed (block 530). For example, client device 210 may select one or more selected nodes based on the one or more predictive models. Client device 210 may select the one or more selected nodes to determine whether to perform an action with regard to the one or more selected nodes. The action may include deactivating the one or more selected nodes, activating the one or more selected nodes, changing an operational parameter of the one or more selected nodes, or the like. By selecting one or more selected nodes, client device 210 reduces a quantity of nodes for which to simulate future performance, thereby conserving processor resources. For example, rather than iteratively simulating effects of performing an action on each node of the geographical network, client device 210 may select one or more selected nodes based on the one or more predictive models, thereby reducing a quantity of nodes for which the effects are to be simulated.

In some implementations, client device 210 may provide transaction information and/or node information to server device 230, and server device 230 may select the one or more selected nodes based on the one or more predictive models and/or based on performance of the one or more selected nodes, which conserves processor power of client device 210.

In some implementations, client device 210 may select a selected node based on performance information associated with the selected node. For example, if a particular node is associated with performance information that does not satisfy a threshold (e.g., a threshold relating to profitability, sales, quantity of transactions, operating margin, etc.), client device 210 may select the particular node as the selected node.

In some implementations, client device 210 may select a selected node based on the one or more predictive models. For example, client device 210 may input, to a retention model, transaction information and/or node information associated with a particular node of a geographical network. The retention model may output a predicted quantity or ratio of shared entities to be retained by other nodes of the geographical network after deactivation of the particular node. Based on the predicted quantity or ratio of shared entities, client device 210 may select the particular node as the selected node and/or may test one or more other nodes of the geographical network using the retention model. In this way, client device 210 selects a selected node based on a retention model, which improves accuracy of the selection, thereby conserving processor resources that would otherwise be used to simulate effects of performing actions with regard to a larger quantity of nodes.

As another example, client device 210 may input, to an acquisition model, transaction information and/or node information associated with a particular node of the geographical network. The acquisition model may output a predicted distribution of new entities among other nodes of the geographical network if the particular node is deactivated. Based on the predicted distribution of new entities, client device 210 may select the particular node for deactivation and/or may test one or more other nodes of the geographical network using the acquisition model. In this way, client device 210 selects a selected node based on an acquisition model, which improves accuracy of the selection, thereby conserving processor resources that would otherwise be used to simulate effects of performing actions with regard to a larger quantity of nodes.

In some implementations, client device 210 may select a selected node based on multiple, different criteria. For example, client device 210 may select a selected node based on a combination of criteria, a weighted combination of criteria, or the like. When client device 210 selects a selected node based on a weighted combination of criteria, client device 210 may determine the weights to be assigned to the criteria automatically (e.g. without user input). For example, client device 210 may determine and/or refine the weights based on a machine learning algorithm, a predictive model, or the like. For a more detailed description of generation and refinement of predictive models, see the description of block 440 of FIG. 4A, above.

As one possible example, client device 210 may select a selected node based on a weighted combination of a predicted quantity of entities to be retained by other nodes of a geographical network (e.g., as output by a retention model), a predicted distribution of new entities among the other nodes (e.g., as output by an acquisition model), and a measure of profitability of the selected node as compared to the other nodes. In such a situation, client device 210 may rank nodes of the geographical network, and may select one or more of the nodes of the geographical network (e.g., based on ranks assigned to the nodes, based on a user input identifying the one or more selected nodes, etc.). Client device 210 may determine weights for the criteria based on a machine learning algorithm, a regression-based model, a user input, a default value, or the like.

Other examples of selection criteria are possible, and client device 210 may select a selected node based on any combination of transaction information, node information, or other information. Additionally, or alternatively, client device 210 may select a selected node based on a user input, based on a default rule, or the like.

In some implementations, client device 210 may select multiple selected nodes based on any of the above criteria, and may perform the operations described herein with regard to each of the multiple selected nodes. For example, assume that client device 210 selects a first selected node based on any of the above criteria. Client device 210 may simulate deactivation of the first selected node, and may select a second selected node after simulating deactivation of the first selected node (i.e., assuming that the first selected node has been deactivated). Client device 210 may continue to iteratively select nodes and simulate deactivation of nodes for any arbitrary number of selected nodes.

As further shown in FIG. 5, process 500 may include determining first performance information for the set of nodes assuming the action is not performed with regard to the one or more selected nodes (block 540). For example, client device 210 may determine first performance information describing predicted performance of the set of nodes assuming that the action is not performed with regard to the one or more selected nodes. When the action includes deactivating a selected node, client device 210 may predict performance of the set of nodes assuming that the selected node remains active. When the action includes activating a selected node, client device 210 may predict performance of the set of nodes assuming that the selected node remains inactive. In some implementations, client device 210 may determine the second performance information for a particular length of time (e.g., 6 months, 1 year, 5 years, a user-specified length of time, or a different length of time).

Client device 210 may determine the first performance information using the transaction information and/or node information for the set of nodes. For example, the node information may identify gross receipts, gross profit, net profit, operating margin, or the like, for the set of nodes. In some implementations, client device 210 may predict a change in the node information based on one or more assumptions about future performance of the set of nodes. For example, based on node growth assumptions, market growth assumptions, assumptions regarding competitor performance and actions, node types (e.g., online stores, brick-and-mortar retail stores, mall kiosks, etc.), or the like, client device 210 may predict a change in the node information, such as an increase in profit margin, a decrease in transaction volume, a change in an operating margin, or the like.

In some implementations, client device 210 may determine the first performance information based on age of entities associated with the set of nodes. For example, client device 210 may determine values for first performance information (e.g., profit margin, transaction volume, operating margin, entities retained, etc.) for a node, and may adjust the first performance information based on an average age of entities associated with the node. In some implementations, client device 210 may determine how to adjust the first performance information based on an erosion model, based on an assumption or observation regarding entity behavior at a particular age, or the like. For example, assume that entities associated with a set of nodes tend to perform fewer transactions as age of the entities increases. Client device 210 may determine a factor to describe the tendency of the entities to perform fewer transactions, and may use the factor to adjust a predicted quantity of transactions of the set of nodes.

As further shown in FIG. 5, process 500 may include determining second performance information for the set of nodes based on the one or more predictive models and assuming that the action is performed (block 550). For example, client device 210 may determine second performance information describing predicted performance of the set of nodes assuming that the action is performed with regard to the one or more selected nodes. In a situation where the action includes deactivating a selected node, client device 210 may predict an effect, on other nodes of the set of nodes, of the deactivation. In a situation where the action includes activating a selected node, client device 210 may predict an effect, on other nodes of the set of nodes, of the activation. In some implementations, client device 210 may determine the second performance information for a particular length of time (e.g., 6 months, 1 year, 5 years, or a different length of time).

To determine the second performance information, client device 210 may use one or more predictive models, such as a retention model, an acquisition model, an erosion model, or the like. For example, if a selected node is to be deactivated, client device 210 may use a retention model to predict a percentage of entities and/or transactions, associated with the selected node, that may be retained by other nodes of the set of nodes.

In some implementations, client device 210 may use a retention model to determine a percentage of entities and/or transactions, associated with the selected node, that may be collectively retained by all of the nodes of the geographical network, and may use the percentage to determine a future performance value for the nodes of the geographical network. The future performance value may include, for example, a quantity of revenue, transactions, entities, etc. that may be collectively retained by all of the nodes of the geographical network.

In some implementations, client device 210 may determine relative portions of the entities and/or transactions that may be retained by each of the nodes. For example, assume that overlap information indicates that the selected node shares a first set of entities with a first node, and that the selected node shares a second set of entities with a second node. Assume further that the first set of entities is larger than the second set. In that case, client device 210 may determine that a larger portion of the revenue associated with the selected node will be retained by the first node than by the second node.

In some implementations, client device 210 may use an acquisition model to predict a change in a quantity of new entities associated with the other nodes of the set of nodes, or of the geographical network. For example, if the acquisition model outputs information indicating that 25% of new entities associated with the selected node may be retained by the geographical network, client device 210 may determine that 25% of revenue of the selected node that is associated with new entities may be acquired by the other nodes in the geographical network. In some implementations, client device 210 may determine relative portions of a set of new entities that may be retained by respective nodes of the geographical network. For example, if overlap information indicates that the selected node shares a first set of entities with a first node and a second set of entities with a second node, client device 210 may determine quantities of new entities to assign to the first node and the second node based on relative sizes of the first set of entities and the second set of entities.

In some implementations, client device 210 may determine first performance information, and may use the first performance information to determine second performance information. For example, assume that a selected node of a geographical network is to be deactivated. Client device 210 may predict an operating margin and/or a net revenue value for the selected node for a particular time period assuming that the selected node is not deactivated. Client device 210 may use a retention model to predict a percentage of entities, associated with the selected node, that will be retained by the geographical network. Additionally, or alternatively, client device 210 may use an acquisition model to predict a percentage of new entities, associated with the selected node, that will be acquired by the geographical network, respectively.

Continuing the above example, client device 210 may determine, based on overlap information identifying shared entities, shares of the operating margin and/or the net revenue to distribute to the other nodes of the geographical network. Client device 210 may scale the operating margin and/or the net revenue based on the percentage of entities that will be retained by the geographical network and the percentage of new entities. For example, if 60 percent of entities associated with the selected node are predicted to be retained by the geographical network, client device 210 may reduce the predicted operating margin and/or net revenue to 60 percent of an original value of the known operating margin and/or the net revenue. Client device 210 may distribute the predicted operating margin and/or net revenue value among the other nodes of the geographical network based on the overlap information. In some implementations, client device 210 may use an erosion model to scale the predicted operating margin and/or net revenue for the other nodes based on respective ages of entities associated with the other nodes.

As further shown in FIG. 5, process 500 may include storing and/or providing comparison information based on comparing the first performance information and the second performance information (block 560). For example, client device 210 may compare the first performance information (i.e., assuming the action is not performed) and the second performance information (i.e., assuming the action is performed) to determine comparison information. The comparison information may indicate whether performance of the nodes of the geographical network is predicted to improve if the action is performed. For example, in a situation where the action is deactivating a selected node, the comparison information may indicate whether performance of the remaining nodes is predicted to improve (e.g., based on sales associated with the remaining nodes, profitability of the remaining nodes, operating margins of the remaining nodes, etc.).

In some implementations, client device 210 may provide, for display, the first performance information, the second performance information, and/or the comparison information. For example, client device 210 may generate a summary of the first performance information, the second performance information, and/or the comparison information (e.g., in a profit and loss sheet, a balance sheet, etc.), and may provide the summary for display via a screen of client device 210 or another device. The summary may identify, for example, a net profit improvement of the geographical network, sales and/or profitability based on the first performance information, sales and/or profitability based on the second performance information, a change in an operating margin after the action is performed, a change in return on investment, or the like.

In some implementations, client device 210 may cause an action to be performed with regard to the selected node. For example, assume that a selected node is associated with a particular node device 220. In such a case, client device 210 may compare the first performance information and the second performance information to determine whether an action should be performed with regard to the selected node and/or the particular node device 220. When client device 210 determines that the action should be performed with regard to the selected node and/or the particular node device 220, client device 210 may cause the action to be performed. In some implementations, client device 210 may cause the particular node device 220 to perform the action. For example, when the action includes deactivating the selected node, client device 210 may cause the particular node device 220 to deactivate the selected node, may dispatch a technician to deactivate the particular node device 220, or the like. In this way, client device 210 causes an action to be performed with regard to a selected node.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, client device 210 groups nodes into geographical networks based on shared entities associated with the nodes, trains predictive models to predict an effect of performing an action with regard to one or more of the nodes, and outputs information describing predicted effects of performing the action. By grouping the nodes into geographical networks, client device 210 conserves processor and storage resources that would otherwise be used to process larger sets of data relating to nodes not included in the geographical networks.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, executing instructions to:
   receive transaction information identifying a plurality of nodes and transactions associated with the plurality of nodes,
      the transactions being between nodes, of the plurality of nodes, and entities of a plurality of entities;
   determine geographical locations corresponding to the plurality of nodes;
   determine node information based on the transaction information,
      the node information identifying nodes, of the plurality of nodes, that are associated with shared entities,
         a shared entity being an entity that has performed transactions with at least two nodes of the plurality of nodes;
   generate, based on the geographical locations and the node information, a geographical network that includes the at least two nodes;
   select an anchor node of the plurality of nodes;
   associate the anchor node with the geographical network;
   identify proximate nodes, of the plurality of nodes, that are within a particular distance of the anchor node; and
   selectively add one or more proximate nodes to the geographical network based on the node information,
      a particular proximate node, of the one or more proximate nodes, to be added to the geographical network when the particular proximate node is associated with a shared entity value that satisfies a threshold,
         the threshold being based on a quantity of shared entities that have performed one or more transactions with any node of the geographical network, and
      the particular proximate node not to be added to the geographical network when the particular proximate node is not associated with a shared entity value that satisfies the threshold,
   train one or more predictive models based on:
      the transaction information,
      the node information, and
      the geographical network,
      the one or more predictive models for predicting future performance of the at least two nodes;
   select a node, of the at least two nodes, on which to perform an action;
   determine first performance information for the plurality of nodes based on predicting the future performance of the at least two nodes assuming that the action is performed,
      the first performance information being determined based on information outputted by the one or more predictive models; and
   store or provide the first performance information.

2. The device of claim 1, where the one or more processors, when selecting the node, are to:
   select the node based on the node information,
      the selected node being selected based on the selected node being associated with a shared entity value that satisfies a threshold,
      the threshold being based on a quantity of shared entities that have performed one or more transactions with any node of the geographical network.

3. The device of claim 1, where:
the one or more predictive models are to receive, as input, the transaction information relating to a particular node of the plurality of nodes, and
the one or more predictive models are to output information identifying a quantity of entities that have performed transactions with the particular node and that are predicted to perform a transaction with another node of the geographical network if the particular node is deactivated.

4. The device of claim 3, where the one or more processors, when selecting the node, are to:
select the node based on the information outputted by the one or more predictive models.

5. The device of claim 1, where the one or more processors, when selecting the node, are to:
select the node based on past performance of the selected node.

6. The device of claim 1, where the one or more processors are to:
determine second performance information based on predicting future performance of the at least two nodes assuming that the action is not performed;
determine that the action is to be performed based on comparing the first performance information and the second performance information; and
cause the action to be performed.

7. A non-transitory computer-readable medium storing instructions, the instructions comprising:
one or more instructions that, when executed by one or more processors, cause the one or more processors to:
receive input information identifying a plurality of nodes,
the input information identifying a plurality of transactions between nodes, of the plurality of nodes, and entities of a plurality of entities,
the input information identifying locations corresponding to the plurality of nodes;
determine overlap information based on the input information,
the overlap information identifying nodes, of the plurality of nodes, that are associated with shared entities,
a shared entity being an entity that has performed transactions with at least two nodes of the plurality of nodes;
generate a geographical network including a set of nodes, of the plurality of nodes, based on each node of the set of nodes being associated with a shared entity value that satisfies a threshold,
the threshold being based on a quantity of shared entities that have performed one or more transactions with any node of the geographical network;
generate, based on the input information and the overlap information, a predictive model to predict an effect of deactivating a particular node of the plurality of nodes,
the particular node, when deactivated, being unavailable to perform transactions;
select a node, of the plurality of nodes, to potentially deactivate,
the selected node being selected based on the selected node being associated with one or more of:
a greater quantity of shared entities than other nodes of the at least two nodes; or
a greater ratio of shared entities to all entities associated with the selected node, as compared to ratios of shared entities to all entities corresponding to the other nodes of the at least two nodes;
determine a predicted effect of deactivating the selected node based on the predictive model and based on a particular quantity of shared entities associated with the selected node; and
store or provide information describing the predicted effect.

8. The non-transitory computer-readable medium of claim 7, where the geographical network is a first geographical network associated with a first plurality of shared entities; and
where the set of nodes is a first set of nodes; and
where the one or more instructions, that cause the one or more processors to generate the first geographical network, cause the one or more processors to:
generate a second geographical network including a second set of nodes of the plurality of nodes,
the second set of nodes being associated with a second plurality of shared entities that is different than the first plurality of shared entities.

9. The non-transitory computer-readable medium of claim 7, where the selected node is associated with a first quantity of new entities,
the first quantity of new entities having performed a transaction with the selected node without having previously performed a transaction with any node of the plurality of nodes; and
where the predictive model outputs information identifying a second quantity of new entities that are predicted to perform a transaction with one or more other nodes of the plurality of nodes,
the second quantity of new entities not having previously performed a transaction with any node of the plurality of nodes.

10. The non-transitory computer-readable medium of claim 9, where the overlap information identifies respective sets of shared entities that are associated with the selected node and each other node of the plurality of nodes; and
where the one or more instructions, that cause the one or more processors to determine the predicted effect, cause the one or more processors to:
distribute, among each node, of the plurality of nodes, other than the selected node, the second quantity of new entities,
the second quantity of new entities being distributed based on relative sizes of the respective sets of shared entities.

11. The non-transitory computer-readable medium of claim 7, where the one or more instructions, when executed by the one or more processors, cause the one or more processors to:
determine first information based on predicting performance of the plurality of nodes with regard to a metric,
the first information being determined based on an assumption that the selected node is not deactivated; and
determine second information based on the predictive model and based on an assumption that the selected node is deactivated,
the second information being determined based on predicting performance of the plurality of nodes with regard to the metric; and cause the selected node to be deactivated based on comparing the first information and the second information.

12. A method, comprising:
receiving, by a device, transaction information describing a plurality of nodes and transactions associated with the plurality of nodes,
the transactions being between nodes, of the plurality of nodes, and entities of a plurality of entities;
determining, by the device, node information based on the transaction information,
the node information identifying nodes, of the plurality of nodes, that are associated with shared entities,
a shared entity being an entity that has performed transactions with at least two nodes of the plurality of nodes;
generating, by the device, a geographical network that includes the at least two nodes,
the geographical network being generated based on geographical locations of the plurality of nodes and based on the node information;
selecting, by the device, an anchor node of the plurality of nodes;
associating, by the device, the anchor node with the geographical network;
identifying, by the device, proximate nodes, of the plurality of nodes, that are within a particular distance of the anchor node; and
selectively adding, by the device, one or more proximate nodes to the geographical network based on the node information,
a particular proximate node, of the one or more proximate nodes, to be added to the geographical network when the particular proximate node is associated with a shared entity value that satisfies a threshold,
the threshold being based on a quantity of shared entities that have performed one or more transactions with any node of the geographical network, and
the particular proximate node not to be added to the geographical network when the particular proximate node is not associated with a shared entity value that satisfies the threshold,
training, by the device, one or more predictive models based on:
the transaction information,
the node information, and
the geographical network,
the one or more predictive models for predicting future performance of the at least two nodes;
selecting, by the device, a node, of the at least two nodes, on which to perform an action;
determining, by the device, first performance information for the plurality of nodes based on predicting future performance of the at least two nodes assuming that the action is performed,
the first performance information being determined based on information outputted by the one or more predictive models; and
storing or providing, by the device, the first performance information.

13. The method of claim 12, where selecting the node comprises:
selecting the node based on at least one of:
a quantity of shared entities associated with the selected node,
a performance value associated with the selected node, or
a quantity of new entities associated with the selected node,
the new entities having performed respective first transactions with the selected node in a time period,
the new entities having not performed a transaction with any node of the at least two nodes before the respective first transactions.

14. The method of claim 12, where determining the first performance information further comprises:
determining an erosion value for a particular node of the at least two nodes,
the particular node being associated with a group of entities,
the erosion value being determined based on respective lengths of time that entities, of the group of entities, have been associated with the particular node;
determining a future performance value based on the transaction information associated with the particular node; and
modifying the future performance value based on the erosion value to determine the first performance information.

15. The method of claim 14, where the future performance value relates to one or more of:
a revenue value associated with the particular node,
a profit value associated with the particular node,
an operating margin associated with the particular node,
a quantity of entities associated with the particular node, or
a quantity of transactions associated with the particular node.

16. The method of claim 12, where the one or more predictive models outputs the first performance information corresponding to a particular node, of the at least two nodes, based on the transaction information and the node information relating to the particular node.

17. The method of claim 16, where the one or more predictive model outputs information identifying one or more of:
a quantity of entities, associated with the particular node, that are predicted to perform a transaction with another node, of the at least two nodes, other than the particular node, assuming that the action is performed with regard to the particular node, or
a quantity of new entities that are predicted to perform a transaction with another node, of the at least two nodes, other than the particular node,
the new entities including entities that have not previously performed a transaction with any node of the at least two nodes.

18. The device of claim 1, where the one or more processors, when determining the first performance information, are further to:
determine an erosion value for a particular node of the at least two nodes,
the particular node being associated with a group of entities,
the erosion value being determined based on respective lengths of time that entities, of the group of entities, have been associated with the particular node;
determine a future performance value based on the transaction information associated with the particular node; and modify the future performance value based on the erosion value to determine the first performance information.

19. The device of claim 18, where the future performance value relates to one or more of:
   a revenue value associated with the particular node,
   a profit value associated with the particular node,
   an operating margin associated with the particular node,
   a quantity of entities associated with the particular node, or
   a quantity of transactions associated with the particular node.

20. The non-transitory computer-readable medium of claim 11, where the one or more instructions, that cause the one or more processors to determine the first information, cause the one or more processors to:
   determine an erosion value for a particular node of the at least two nodes,
      the particular node being associated with a group of entities,
         the erosion value being determined based on respective lengths of time that entities, of the group of entities, have been associated with the particular node;
   determine a future performance value based on the second information associated with the particular node; and
   modify the future performance value based on the erosion value to determine the first information.

* * * * *

UNITED STATES PATENT AND TRADEMARK OFFICE
CERTIFICATE OF CORRECTION

PATENT NO. : 10,142,187 B2
APPLICATION NO. : 15/141138
DATED : November 27, 2018
INVENTOR(S) : Charu Nahata et al.

Page 1 of 1

It is certified that error appears in the above-identified patent and that said Letters Patent is hereby corrected as shown below:

The Assignee "Accenture Global Soltuions Limited" should be changed to --Accenture Global Solutions Limited--.

Signed and Sealed this
Second Day of June, 2020

Andrei Iancu
*Director of the United States Patent and Trademark Office*